Dec. 21, 1926.   1,611,534
M. KRAFFT
PROCESS AND APPARATUS FOR THE MANUFACTURE AND PRODUCTION OF CHEMICALLY
PURE SULPHURIC ACID
Filed April 5. 1923
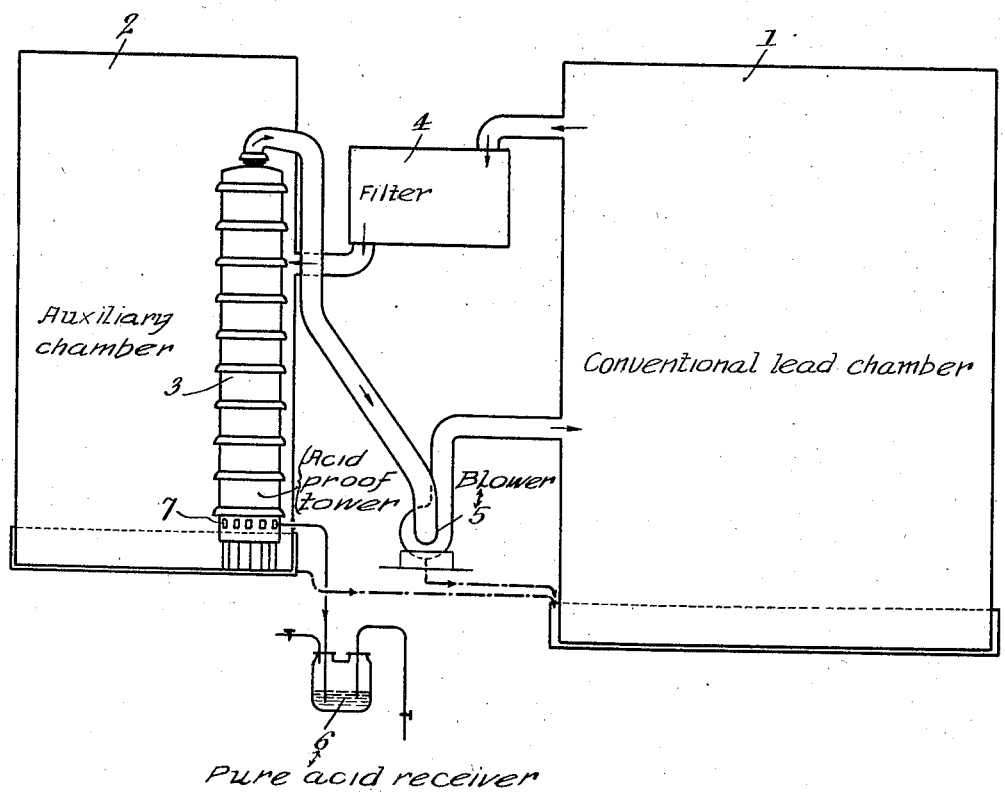
Inventor
Max Krafft
By Byrnes Townsend & Bruckenstein
his Attorney Patented Dec. 21, 1926.

1,611,534

UNITED STATES PATENT OFFICE.

MAX KRAFFT, OF HRUSCHAU, CZECHOSLOVAKIA.

PROCESS AND APPARATUS FOR THE MANUFACTURE AND PRODUCTION OF CHEMICALLY-PURE SULPHURIC ACID.

Application filed April 5, 1923, Serial No. 630,420, and in Germany April 10, 1922.

The direct production of chemically pure acid by the chamber process without subsequent distillation has hitherto been attempted without success, because the acid must come into contact during its manufacture with materials which are not completely incorrodible. The use of platinum, which would lead to the production of a pure product, is not possible for reasons of economy.

The process hereinafter described overcomes the above mentioned difficulties as follows:—

The burner gases are purified by one of the usual methods to such an extent that all impurities arising out of the roasting process are removed. The acid which is formed in the chamber from such gases will however, never meet the requirements of a chemically pure acid, nor can it be used as the starting material for the preparation of such acid, because it will contain in addition to the easily separable gaseous constituents, solid impurities, which arise from the lead apparatus and the water used, and which can only be separated by distillation.

By transferring the chamber process partly or mainly inside the system in apparatus which is made of material which is corroded neither by the reacting gases nor by the acid formed, and which contains filling material of similar incorrodibility, the contamination of the part of the chamber acid formed therein with the aforesaid solid constituents has successfully been avoided. An advantage of such a construction of the reaction apparatus is that no luting material whatever is necessary. The apparatus must also be constructed in such a manner that the acid separated on the outside surface does not reach the inside.

The method of operation is as follows:—

A part or the whole of the gases passing through the chamber or even a quantity exceeding the totality of the gases passing through the chamber is drawn by artificial means through one or more apparatus, for example, towers, constructed as above-described, and discharged back again into a suitable part of the chamber. In the apparatus, for example, in the lowest part of the tower, an acid collects which, indeed, contains some gaseous foreign constituents such as $SO_2$ and nitroso compounds which can be easily separated but does not contain any metallic constituents.

The amount of acid produced by means of such an apparatus is dependent, apart from the speed of the reaction, only on the quantity of gas passing through the apparatus in the unit of time. It is obvious therefore that such apparatus may be employed to produce an extraordinary increase in the capacity of a chamber system, and further, if the manufacture of acid of special purity is not required, any other suitable material may of course be used for the construction of the apparatus.

Instead of building the apparatus for the separation of the pure acid in the ordinary chamber system, it is advantageous to provide a relatively small independent auxiliary chamber in which the reaction apparatus is arranged. The gases are then taken from the main chamber and conducted into the auxiliary chamber containing the reaction apparatus and then discharged back again into a suitable part of the main chamber. Such an apparatus is illustrated in the accompanying drawing in which 1 represents the conventional lead chamber, 2 is the auxiliary chamber, 3 is a tower constructed of acid proof material and arranged within the auxiliary chamber 2, 4 is a filter, 5 a blower, and 6 the pure acid collecting vessel. As is indicated the gases pass from the chamber 1 through filter 4 to the chamber 2 and are drawn into openings 7 at the base of the tower 3 by the suction produced by the blower 5 passing upwardly through the tower and finally back into the chamber 1. Acid formed and separated from the gases in the tower 3 collects at the bottom thereof and flows into the vessel 6. Acid formed and separated in the filter 4, blower 5, auxiliary chamber 2 and in the gas conduits flows as indicated to the bottom of the chamber 1 where it collects with the impure acid produced in the chamber 1. By means of this modification the advantage is obtained that the gases taken from the main chamber can be finally purified again and, while the main chamber is charged with ordinary water in the normal manner, the reaction in the auxiliary chamber can be carried out with steam or specially purified water.

Forms of apparatus other than that illustrated, for separating the acid, may be employed. An essential condition is always that the material of the apparatus is not corrodible by the gases and the acid produced.

I claim:

1. In the process for the manufacture and production of sulphuric acid by the lead chamber process the steps which consist in supplying the chambers with thoroughly purified burner gases, circulating the chamber gases through acid proof apparatus capable of separating acid therefrom, and collecting the acid so separated from the gases separately from the acid precipitated in the chambers.

2. In the process for the manufacture and production of sulphuric acid by the chamber process the steps which consist in supplying the chambers with thoroughly purified burner gases, separating acid from the gases in said chambers by acid proof means, and collecting the acid so separated independently of acid separated from the gases upon the chamber walls.

3. Apparatus for the manufacture and production of sulphuric acid comprising a lead chamber, acid proof means for removing acid from gases, and means for passing the gases from the lead chamber through said means and back into the chamber.

MAX KRAFFT.